Figure 1:
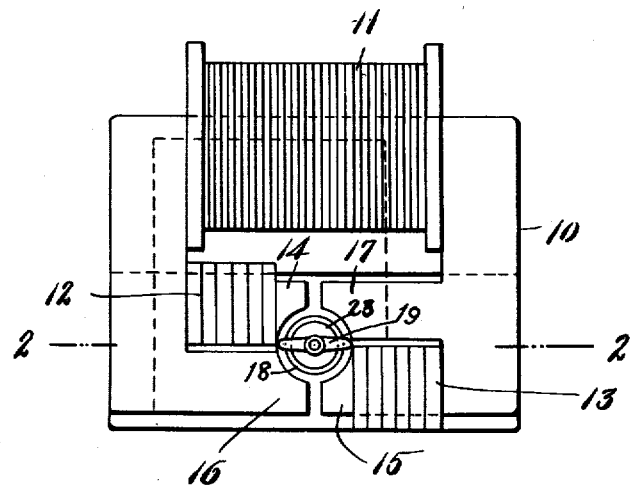

June 10, 1924.

H. E. WARREN

ALTERNATING CURRENT MOTOR

Filed Aug. 4, 1919

1,497,394

Inventor:
Henry E. Warren
by Jas. H. Churchill
Atty.

Patented June 10, 1924.

1,497,394

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

ALTERNATING-CURRENT MOTOR.

Application filed August 4, 1919. Serial No. 315,128.

*To all whom it may concern:*

Be it known that I, HENRY E. WARREN, a citizen of the United States, residing at Ashland, in the county of Middlesex and State of Massachusetts, have invented an Improvement in Alternating-Current Motors, of which the following description, in connection with the accompanying drawings, is a specification, like characters on the drawing representing like parts.

This invention relates to alternating current motors and especially those which are inherently self-starting, and has for its object to provide an efficient motor of the character described. To this end the motor is provided with a rotor of relatively strong synchronous characteristics and with a rotor of relatively strong starting characteristics, which co-operate so that each rotor influences the other in establishing synchronous speed of said rotors. The invention further relates to a novel method of starting a synchronous motor of the character described, whereby the motor may be started with a minimum torque.

The particular features of the invention will be pointed out in the claims at the end of this specification.

Figure 2:
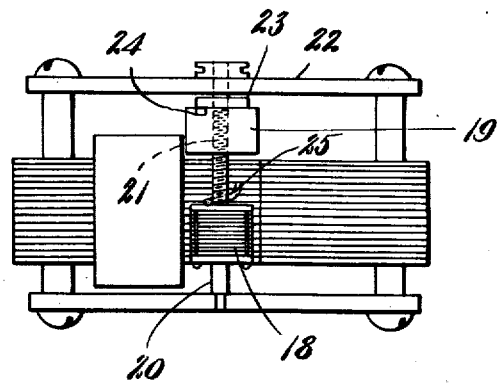
Figure 3:
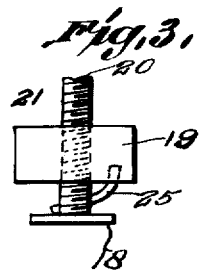
Figure 4:

Fig. 1 is a plan view of an alternating current motor embodying the invention,

Fig. 2, a sectional elevation of the motor shown in Fig. 1, on the line 2—2;

Figs. 3 and 4, details to be referred to.

In the embodiment of the invention herein shown, 10 represents a field structure or stator which is excited by a winding 11 supplied with alternating current.

The stator is further provided with shading coils 12, 13, for the purpose of producing a time lag in the alternating magnetism in the pole faces 14, 15, behind that in the pole faces 16, 17, respectively, and thus produce a rotating magnetic field. This form of field structure is old and for the purpose of this invention, it is equally satisfactory to use any other form of stator in which there is a rotating magnetic field.

Located centrally with regard to the pole faces of the stator are two rotors 18, 19, one of which as 18 being shown with a squirrel cage winding, which has relatively strong starting characteristics, and the other 19 being geographically polar so as to have relatively strong synchronizing characteristics.

The rotors 18, 19, are central with respect to a shaft 20 on which they are mounted and the rotor 18 is preferably fast thereon, whereas the rotor 19 is loose upon the shaft 20 but engages with it through a screw-thread 21. The depth of the stator is considerably greater than the width of the rotor 18, and the bearing plate 22 for the upper end of the shaft 21 is located at a sufficient distance from the stator to provide room for the rotor 19 to be wholly or nearly outside of the field as shown in Fig. 2. Mounted on the shaft 20 to revolve thereon is a device 23, which may be a disk or bar having as shown a pin 24 which is designed to engage the rotor 19 so as to drive or rotate the same. Also revolving with the shaft 20 is a second device 25, (see Fig. 3), which is located within the field and is designed to be engaged by the rotor 19 when the latter is within the field. The device 25 may be a pin extended through the shaft and having one end extended into the path of rotation of the rotor 19, and said pin is preferably made sufficiently thin to be slightly flexible to thereby yield somewhat when engaged by the rotor 19.

When the motor is at rest, the rotor 19 is normally within the influence of the field and adjacent to the rotor 18.

When the motor is started by energizing the winding 11, the rotor 19 tends to stand still with its axis in the direction of the strongest flux passing from pole face 16 to pole face 17. The rotor 18 however, will instantly begin to revolve with a very strong torque. In so doing, the shaft 20 rotates inside the non-rotating rotor 19, but by reason of the screw-thread 21 on the shaft being in threaded engagement with the rotor 19, the latter is moved longitudinally of the shaft 20 and slowly forced outside of the influence of the magnetic field. The velocity of the rotor 18 continues to increase and eventually the rotor 19 is forced into the path of the revolving pin 24.

In consequence of this interference, the rotor 19 is forcibly made to revolve, partly because of the torque of the rotor 18 and partly because of the kinetic energy which the rotor 18 has acquired by reason of its velocity.

The force required to start the rotor 19 into revolution has been very greatly reduced by partially withdrawing it from the influence of the field. Just as soon as the rotor 19 begins to revolve, it will accelerate rapidly and will soon acquire a speed greater than that of the rotor 18, and in fact will soon reach synchronous speed although the rotor 18 would never do so unaided.

In consequence of the relative speeds of the two rotors, the rotor 19, while revolving at synchronous speed, will travel back along the screw-thread 21 toward the rotor 18 and will thus enter the strongest part of the field. When the rotor 19 reaches the limit of its stroke or travel toward the rotor 18, it will engage the pin 25 after the manner represented in Figs. 3 and 4 and act as a driver for the shaft 20 and rotor 18, and thereby compel them to run at synchronous speed. It will thus be seen that the motor starts with a strong torque and eventually is forced up to synchronous speed and held there automatically.

If the motor should be overloaded while running at synchronous speed, the rotor 19 would immediately come to rest and then if the load was not too great or if it should be afterwards reduced, the rotor 18 by its continued revolution would cause the rotor to pass through the same cycle of events as when starting normally, and the motor would thus be automatically brought up to synchronous speed again just as soon as the load was reduced to the point where it could be carried.

From the above description, it will be seen that the rotor 18 having strong starting characteristics acts on or influences the rotor 19 having strong synchronizing characteristics, so that the latter may be quickly brought to synchronous speed, and that the rotor 19 revolving at synchronous speed influences the rotor 18 to bring the latter to synchronous speed.

It will also be observed that the rotor 19 is brought to synchronous speed outside of that zone of the magnetic field which is of maximum strength, and is then returned to said zone while revolving at synchronous speed.

One construction of alternating current motor embodying the invention is herein-shown, but it is not desired to limit the invention to the particular construction shown.

Claims.

1. In a self-starting synchronous motor, means for producing a rotating magnetic field, a plurality of rotors influenced by said field having relative limited rotation with respect to each other within said field.

2. In a self-starting synchronous motor with a rotating magnetic field, a plurality of rotors, one of said rotors having strong starting characteristics, another having strong synchronizing characteristics, means whereby the former rotor is enabled automatically to partially remove the latter rotor from the influence of the magnetic field and to impart motion of rotation to the latter rotor after the former rotor has begun to revolve.

3. In a self-starting synchronous motor, means for producing a rotating magnetic field, a rotor having relatively strong starting characteristics located in said field, a polar rotor having relatively strong synchronizing characteristics and movable in said field independently of said starting rotor, rotatable means driven by said starting rotor for effecting movement of the polar rotor axially in said field away from said starting rotor, and means co-operating with said polar rotor to arrest its movement away from said starting rotor and permit it to be brought to synchronous speed and enable it to be moved toward said starting rotor while revolving at synchronous speed.

4. In a self-starting synchronous motor, means for producing a rotating magnetic field, a polar rotor, means for effecting axial movement of the said rotor away from the field while it is not rotating, means for arresting said axial movement to cause the rotor to be rotated and enable it to be brought up to synchronous speed, and to thereafter be moved into said magnetic field while revolving at synchronous speed.

5. In a self-starting synchronous motor, means for producing a rotating magnetic field, a polar rotor, means for effecting axial movement of the said rotor away from the field while it is not rotating, means for arresting said axial movement to cause the rotor to be rotated and enable it to be brought up to synchronous speed, and to thereafter be moved toward and into said magnetic field while revolving at synchronous speed, a starting rotor within the magnetic field, and means to couple the polar rotor while revolving at synchronous speed with said starting rotor to drive the latter and bring it up to synchronous speed.

6. In a self-starting synchronous motor, means for producing a rotating magnetic field, and a plurality of rotors, normally located within said magnetic field, and means for effecting axial movement of one of said rotors away from the other while it is not rotating synchronously with said field and to effect axial movement of said rotor toward said other rotor when it is rotating in synchronism with said field.

7. In an alternating current motor, means for producing a rotating magnetic field, a substantially polar rotor movable axially in one direction with relation to said magnetic field and into a position wherein it is substantially uninfluenced by said field and is rotated near synchronous speed, and movable in the opposite direction into said magnetic field while revolving at synchronous speed, and means for effecting said movements of said rotor.

8. In a self-starting synchronous motor, means for producing a rotating field, a rotor having strong starting characteristics, a rotor having strong synchronizing characteristics, both of said rotors being, while the motor is in operation, within the influence of the field, and means whereby the rotor having strong starting characteristics is enabled to move the other rotor partially out of the influence of said field while the rotor having strong starting characteristics is rotating slower than at synchronism, and whereby the rotor having strong synchronizing characteristics is enabled to move back into the influence of the field when it has reached synchronous speed.

9. In a self-starting synchronous motor, means for producing a rotating magnetic field, a rotor having strong starting characteristics, a rotor having strong synchronizing characteristics, a shaft for both rotors, the rotor having strong synchronizing characteristics being relatively rotatable upon the shaft and axially movable along it, means dependent upon the relative speeds of the two rotors for moving the axially movable rotor along the shaft, and means for limiting the axial movement and for preventing relative rotation of the axially movable rotor, whereby said rotor while it is rotating at less than synchronous speed, is moved partially out of the field and after it has attained synchronous speed, is moved back into the field.

10. The method of starting a synchronous motor having a pair of relatively rotatable rotors, one having strong starting characteristics and the other having strong synchronizing characteristics, which consists in subjecting the rotor having strong starting characteristics to a relatively strong rotating field to start the same independently of the other rotor, and thereafter starting the said other rotor by the rotor having the strong starting characteristics and then increasing the strength of the field acting upon the rotor having strong synchronizing characteristics.

11. The method of starting a synchronous motor having a pair of rotors, one having strong starting characteristics and the other strong synchronizing characteristics, which consists in producing a rotating field influencing both rotors strongly, partially withdrawing the rotor having strong synchronizing characteristics from said field until the speed of the motor reaches near synchronism, then replacing said rotor so as to be entirely within the influence of the field.

In testimony whereof, I have signed my name to this specification.

HENRY E. WARREN.